United States Patent
Choi et al.

(10) Patent No.: US 10,148,737 B2
(45) Date of Patent: Dec. 4, 2018

(54) SYSTEM AND METHOD FOR MANAGING APPLICATIONS AS IOT OBJECTS

(71) Applicant: Samsung Electronics Co., Ltd., Gyeonggi-do (KR)

(72) Inventors: Minseok Choi, Issaquah, WA (US);
Sung Hwan Lee, Bellevue, WA (US);
Pei Zheng, Sammamish, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 14/881,104

(22) Filed: Oct. 12, 2015

(65) Prior Publication Data

US 2017/0104812 A1  Apr. 13, 2017

(51) Int. Cl.
*G06F 15/16* (2006.01)
*H04L 29/08* (2006.01)
*G06F 9/54* (2006.01)
*H04L 29/06* (2006.01)

(52) U.S. Cl.
CPC ............. *H04L 67/10* (2013.01); *G06F 9/547* (2013.01); *H04L 67/12* (2013.01); *H04L 67/42* (2013.01)

(58) Field of Classification Search
CPC ............................ H04L 63/08; H04L 67/125
See application file for complete search history.

(56) References Cited

U.S. PATENT DOCUMENTS

| 9,009,230 B1 | 4/2015 | Matthieu et al. |
| 2014/0181916 A1 | 6/2014 | Koo et al. |
| 2014/0215043 A1 | 7/2014 | Ryu et al. |
| 2014/0244834 A1* | 8/2014 | Guedalia ................. H04L 67/16 709/224 |
| 2015/0006696 A1* | 1/2015 | Hershberg .............. H04L 67/12 709/223 |
| 2015/0067154 A1 | 3/2015 | Ly et al. |
| 2015/0381776 A1* | 12/2015 | Seed ....................... H04W 4/70 709/203 |
| 2016/0295383 A1 | 10/2016 | Yang et al. |

FOREIGN PATENT DOCUMENTS

CN          104581611 A        4/2015

OTHER PUBLICATIONS

European Patent Office, "European Search Report," Application No. 16179689.1-1853, dated Jan. 30, 2017, 15 pages, publisher EPO, Munich, Germany, place of search The Hague.
European Patent Office Communication regarding Application No. 16179689.1, dated Feb. 21, 2018, 10 pages.

* cited by examiner

*Primary Examiner* — Yves Dalencourt

(57) ABSTRACT

A system, apparatus, and method for managing applications as Internet of Things (IoT) objects includes an IoT server, a computing device, and an IoT application. The IoT server and the computing device communicate via a network. The computing device has an IoT interface and an IoT-enabled application with an RPC interface. The IoT interface uses the RPC interface to communicate with the IoT-enabled application. The IoT interface communicates with the IoT server or the IoT application using an IoT protocol. The IoT interface operates the IoT-enabled application as an IoT device in the system.

20 Claims, 3 Drawing Sheets

SYSTEM AND METHOD FOR MANAGING APPLICATIONS AS IOT OBJECTS

TECHNICAL FIELD

The present application relates generally to communication between applications and, more specifically, to a system and method for managing applications as Internet of Things (IoT) objects.

BACKGROUND

Typically, when a designer determines that a first application should activate a capability of a second application, the designer must build particular information into the first application. First, the first application must be made aware of how inter-application communication is performed in the system that the applications operate within. Second, the first application must be given some knowledge of the remote procedure calls and associated parameters used to cause the second application to perform the desired function.

Such inter-application functionality is typically be predetermined and preprogrammed by a designer. A variety of such capabilities may be designed into one or more applications, to be activated as desired by a user. However, a user generally cannot set up, on the fly, a new arbitrary interconnection that has not been anticipated and provided by a system designer.

SUMMARY

A system for managing applications as Internet of Things (IoT) objects includes an IoT server, a computing device, and an IoT application. The IoT server and the computing device are communicatively coupled to a network. The computing device includes an IoT interface and an IoT-enabled application that has a remote procedure call (RPC) interface. The IoT interface is configured to communicate with the IoT-enabled application using the RPC interface. The IoT interface is further configured to communicate with the IoT server or the IoT application using an IoT protocol that the IoT interface shares with the IoT server or the IoT application. The IoT interface is also configured to operate the IoT-enabled application as an IoT device in the system.

A computing device for use in a system for managing applications as Internet of Things (IoT) objects includes a memory, a processor, and a communications interface. The memory includes a plurality of applications and the processor is configured to execute at least some of the applications. The communications interface is coupled to the processor and configured to communicate with an IoT server. The applications include an IoT interface application and an IoT-enabled application that has an RPC interface. The IoT interface application is configured to communicate with the IoT-enabled application using the RPC interface. The IoT interface application is further configured to communicate with the IoT server or an IoT application using an IoT protocol that the IoT interface application shares with the IoT server or the IoT application. The IoT application is executing on one of the IoT server and the computing device. The IoT interface application is also configured to present the IoT-enabled application as an IoT device to the IoT server or the IoT application.

A method of managing applications as Internet of Things (IoT) objects includes registering a computing device with an IoT server. The method further includes notifying an IoT-enabled application of the completed registration, where the IoT-enabled application is executing in the computing device. The method also includes registering the IoT-enabled application with the IoT server, which includes sending the IoT server information that relates to IoT capabilities of the IoT-enabled application. The method further includes sending an IoT event message to the IoT server in response to the performance of a predefined function by the IoT-enabled application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
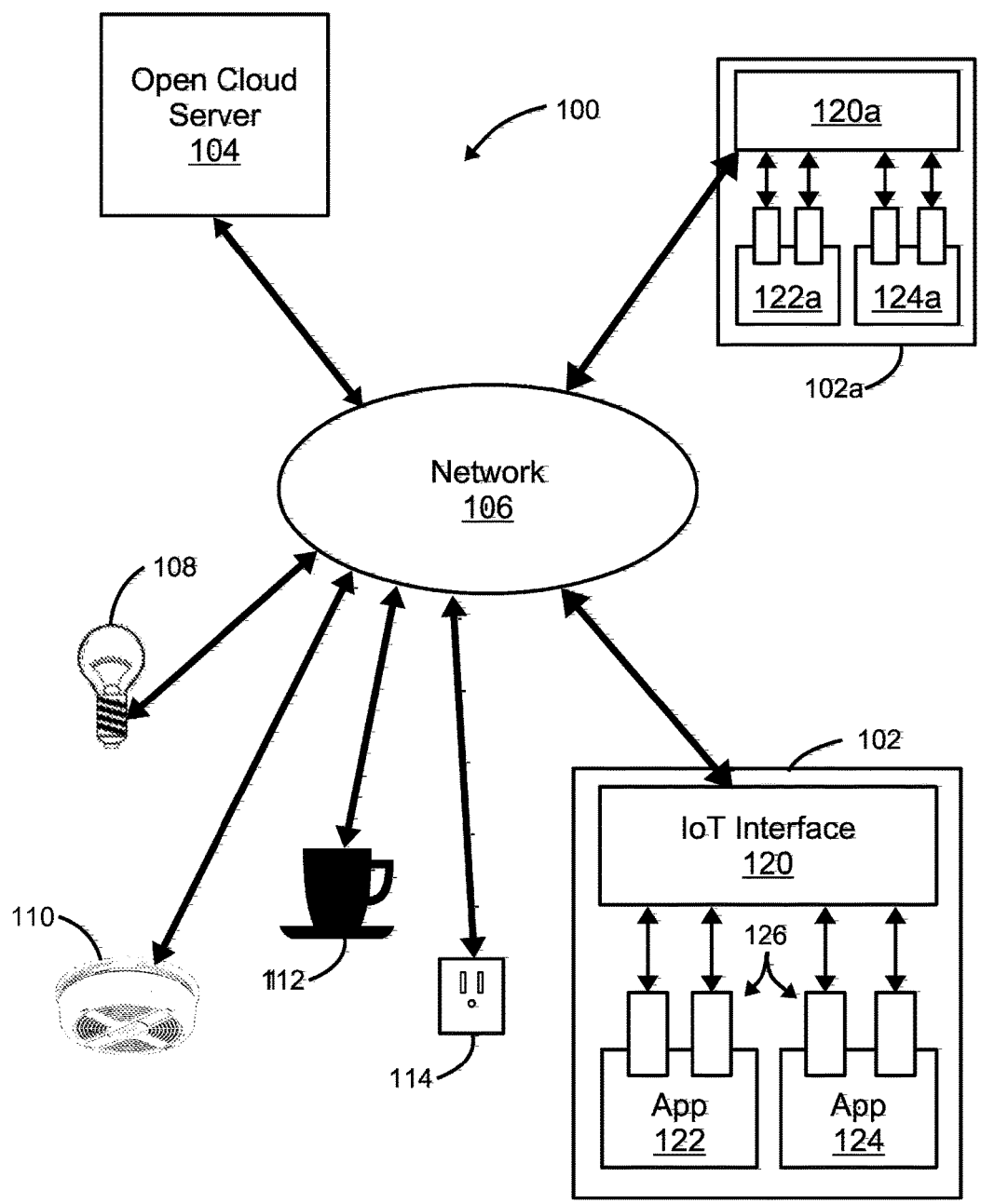
FIG. 1 illustrates a system for managing applications as Internet of Things (IOT) objects according to the disclosure.
Figure 2:
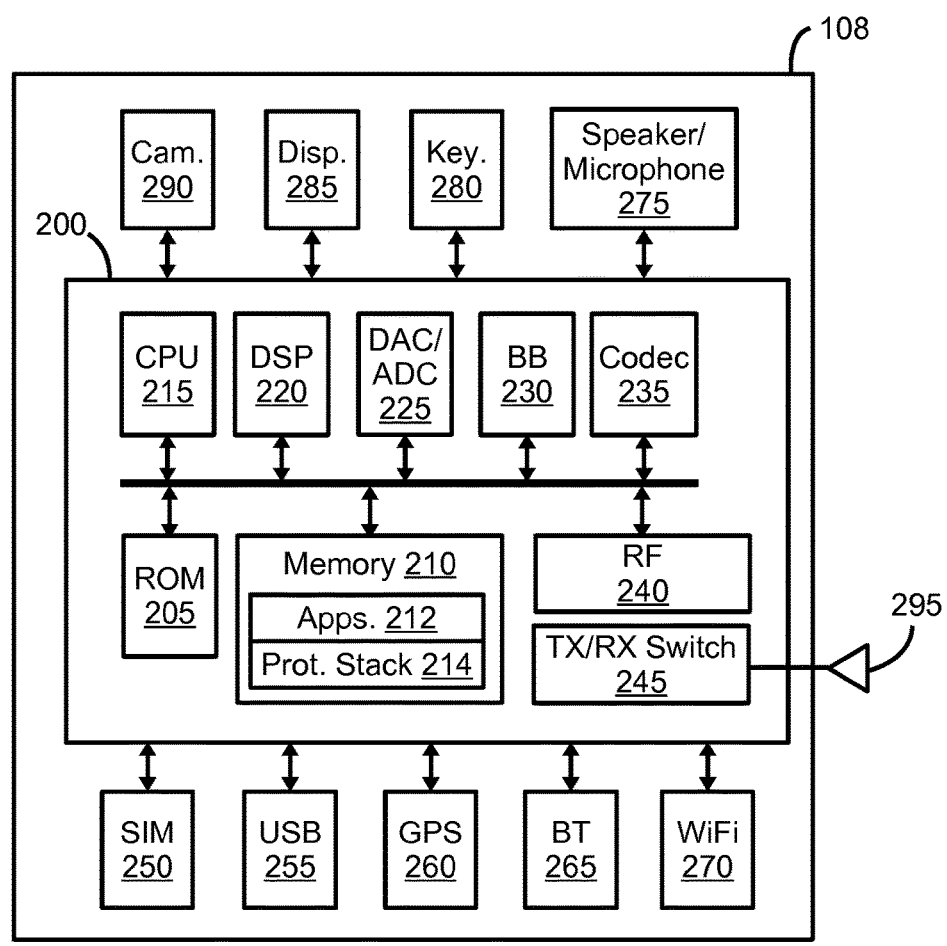
FIG. 2 illustrates a portable computing device for use in a system for managing applications as IOT objects according to the disclosure.
Figure 3:
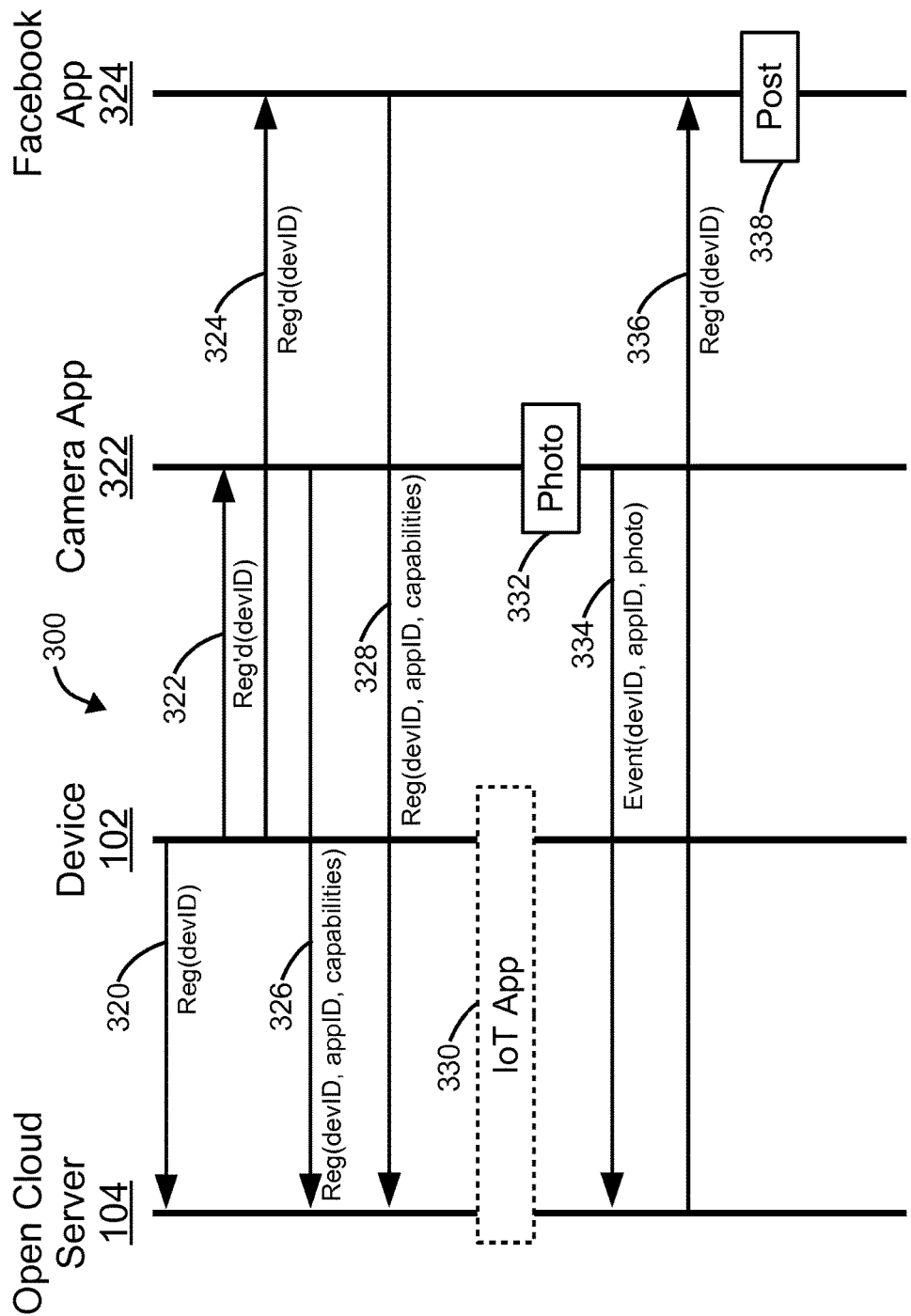
FIG. 3 illustrates a method for managing applications as IOT objects according to the disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method for managing applications as Internet of Things (IoT) objects.

FIG. 1 illustrates a system 100 for managing applications as Internet of Things (IOT) objects according to the disclosure. The system 100 includes a computing device 102, an Open Cloud server 104, and so-called "hard" IoT devices that include a light 108, a smoke detector 110, a coffee maker 112, and a controllable power socket 114. Examples of computing device 102 include, but are not limited to, portable devices such as smart phones, tablets, and laptops, as well as non-portable devices such as desktop computers, smart TVs, and game consoles.

The Open Cloud server 104 utilizes the SmartThings communication protocol and exemplary embodiments in this disclosure are described with reference to the SmartThings protocol. However, it will be understood that in other embodiments other IoT communication protocols may be used, including without limitation the IoTivity protocol. While reference is made herein to a single Open Cloud server, it will be understood that the Open Cloud is typically implemented as a network of servers providing data availability, security, and fail-safe redundancy. While reference is made herein to an Open Cloud server, it will be understood that in other embodiments any suitable IoT server system may be employed.

The devices of the system 100 are coupled to and communicate via a network 106. The network 110 may be the Internet or other wide-area network (WAN), a local-area network (LAN), or any other suitable network providing communication between computer systems.

The computing device 102 includes an IoT interface 120, an application 122, and an application 124. In a preferred embodiment, the IoT interface 120 is a SmartThings application. In other embodiments, the IoT interface 120 may be any suitable module that provides functionality for one or more of translating signals from the applications 122 and/or 124 into IoT events, and executing IoT apps upon receipt of subscribed IoT events.

Each of the applications 122 and 124 include one or more remote procedure calls 126, which provide the IoT interface access to the internal functionality of the applications 122 and 124. Where the application 124 is a calendar app, the RPC 126 may be a procedure call that causes the calendar app to schedule a calendar item at a specified date and/or time with a specified description.

Where the application 124 is an alarm app, for example, upon the occurrence of an alarm at its specified time, an RPC 126 may send an associated signal to the IoT interface 120. The IoT interface 120 may then translate the signal into an IoT event and transmit the event to the Open Cloud Server 104. The Open Cloud Server 104 may then notify a SmartApp (or other IoT application) that has subscribed to the event that the event has occurred. Such a subscribed IoT application may be running on an application engine (app engine) executing on the Open Cloud Server 104, in the IoT interface 120, or on another computing device in communication with the system 100. Upon receiving the event notification, the IoT application will perform one or more programmed functions. Where the IoT application is responding to a wake-up alarm in the morning, the IoT application may be programmed to turn on the light 108 and start the coffee maker 112, for example.

Where the application 124 is a calendar app, an IoT application may subscribe to a "low battery" event generated by the smoke detector 110 and respond to an occurrence of the event by using an IoT command to cause the calendar app 124 to set a reminder for 10:00 AM on the next Saturday to install a new battery in the smoke detector 110.

The system 100 may also include a second computing device 102a, which also includes an IoT interface 120a and applications 122a and 124a similar to the corresponding elements of the computing device 102. Where the application 122 is a camera app, the RPC 126 may be a function call that returns only when a new photo has been taken, providing a pointer to the new photo as a return parameter. In some embodiments, such a notification to the IoT interface 120 may be provided using an interrupt, rather than completion of a function call. In either case, the IoT interface 122 generates an event relating to the new photo. Where the application 124a in the computing device 120a is a Facebook app, the RPC 126 may be a procedure call that causes the Facebook app to post specified text, photo, or video to the Facebook page of a user of the computing device 102a. A SmartApp or other IoT application may subscribe to the photo event and, in response to its occurrence, post the photo using the associated RPC to the Facebook app 124a.

In some embodiments, computing device 102 may be a user's smart phone or other portable device, while device 102a is the user's home computer. In another embodiment, the device 102a may be a computer at the user's place of business, monitoring security equipment and using techniques of the present disclosure to notify the user via the smart phone 102.

The Open Cloud server 104, the IoT interface 120, and any IoT applications executing on app engines in the system 100 communicate using one or more communication protocols that may be referred to as IoT protocols. In a preferred embodiment, the IoT protocol used in the system 100 is the SmartThings protocol.

FIG. 2 provides a block diagram of a computing device 102 for use in a system for for managing applications as IOT objects according to the disclosure. The computing device 102 in FIG. 2 is a portable computing device (PD), however, it will be understood that in other embodiments of the disclosure, the computing device 102 may be a non-portable computing device. The PD 102 may be a mobile phone, tablet, laptop, or other suitable portable device. The PD 102 may include a secure area suitable for executing an IoT interface 120, as shown and described with reference to FIG. 1. The PD 102 comprises core circuitry 200, which includes read-only memory (ROM) 205, random access memory (RAM) 210, central processing unit (CPU) 215, digital signal processor (DSP) 220, digital-to-analog converter (DAC)/analog-to-digital converter (ADC) circuitry 225, baseband (BB) circuitry block 230, codec circuitry block 235, radio frequency (RF) circuitry block 240, transmit (TX)/receive (RX) switch 245, and antenna 295.

In one embodiment, ROM 205 may store a boot-routine and other static data and RAM 210 may store an operating system (not shown), applications 212, and protocol stack 214. The ROM 205 and RAM 210 include a trusted execution environment or other secure area in which the confidentiality and integrity of code and data may be ensured. In an advantageous embodiment, ROM 205 and RAM 210 may comprise a single electronically erasable memory, such as a Flash memory, that is used in conjunction with a conventional RAM memory that is used to store dynamic data.

The PD 102 further comprises SIM card interface 250, USB interface 255, GPS receiver 260, Bluetooth (BT) transceiver 265, WiFi (or WLAN) transceiver 270, speaker and microphone circuitry block 275, keyboard 280, display 285, and camera 290. In some embodiment, keyboard 280 and display 285 may be implemented together as a touch screen display.

CPU 215 is responsible for the overall operation of GD 210. In an exemplary embodiment, CPU 215 executes applications 212 and protocol stack 214. CPU 215 runs the application layer and a wide variety of applications may be run in a smart phone implementation. Applications 212 may include audio, video, and image/graphics applications. CPU 215 may run applications 212 that support various audio formats such as MP3, MP4, WAV, and rm. CPU 215 may run image applications 212 that support JPEG image formats and video applications 212 that support video formats (e.g., MPEG-1 to MPEG-5). CPU 215 may support various operating systems (not shown), such as Symbian, java, android, RT-Linux, Palm, and the like. For time critical applications, CPU 215 runs a real-time operating system (RTOS). In addition to the physical layer, there are other layers, including protocol stack 214, that enable PD 102 to work with a network base station. In an exemplary embodiment, protocol stack 214 is ported on CPU 215.

DAC/ADC circuitry block 225 converts analog speech signals to digital signals, and vice versa, in GD 210. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 230 may be implemented as part of DSP 220, which executes many of the baseband processing functions (i.e., physical layer, Layer 1, or L1 functions). BB circuitry block 230 may be ported on DSP 220 to meet the latency and power requirements of GD 210. BB circuitry block 230 converts voice and data to be carried over the air interface to I/Q baseband signals.

BB circuitry block 230 may change from modem to modem for various air interface standards, such as GSM, CDMA, Wimax, LTE, HSPA, and others. BB circuitry block 230 is often referred to as the physical layer, or Layer 1, or L1. For mobile phones that work on GSM networks, the baseband part (Layer 1) running on DSP 220 and the protocol stack 214 running on CPU 215 are based on the GSM standard. For CDMA mobile phones, the Layer 1 and protocol stack 214 are based on the CDMA standard, and so on, for the LTE and HSPA standards-based mobile phones.

For speech or audio inputs, codec circuitry block 235 may compress and decompress the signal to match the data rate to the frame in which the data is sent. By way of example, codec circuitry block 235 may convert speech at an 8 KHz sampling rate to a 13 kbps rate for a full rate speech traffic channel. To do this, a residually excited linear predictive coder (RELP) speech coder may be which compresses 260 bits into a 20 ms. duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a viterbi decoder (used in receive path). Interleaving may be done for the data, which helps in spreading the error over time, thereby helping the receiver de-interleave and decode the frame correctly.

RF circuitry block 240 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 295 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of GD 210, antenna 295 may support different wire-area standards, including GSM, CDMA, LTE, and WiMAX, as well as short-range standards, including WiFi (WLAN), Bluetooth, and so on.

If antenna 295 comprises only one antenna used for both transmit and receive operations at different times, the TX/RX switch 245 couples both the transmit (TX) path and the receive (RX) path to antenna 295 at different times. TX/RS switch 245 is controlled automatically by DSP 220 based on a GSM frame structure with respect to the physical slot allocated for that particular GSM mobile phone in both the downlink and the uplink. For frequency division duplexing (FDD) systems, TX/RX switch 245 may be implement as a diplexer that acts as filter to separate various frequency bands.

The PD 102 provides connectivity with laptops or other devices using WiFi (or WLAN) transceiver 270, BT transceiver 265, and universal serial bus (USB) interface 255. The PD 102 also uses GPS receiver 260 in applications 212 that require position information. If PD 102 is a conventional smart phone, applications 212 may include many popular applications, such as Facebook, Twitter, a browser, and numerous games that come pre-installed with GD 210.

Speaker and microphone circuitry block 275 comprises microphone circuitry (or mic) that converts acoustic energy (i.e., air pressure changes caused by speech or other sounds) to electrical signals for subsequent processing. Speaker and microphone 275 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

The PD 102 preferably includes camera 290. Presently, almost all mobile phones feature a camera module. Camera 290 may comprise a 12 megapixel, 14 megapixel, or even a 41 megapixel camera.

Display 285 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 280 may comprise a simple matrix type keypad that contains numeric digits (0 to 9), alphabetic characters (A to Z), special characters, and specific function keys. In a more advanced embodiment for a smart phone implementation, keypad 280 may be implemented in the mobile phone software, so that keyboard 280 appears on display 285 and is operated by the user using the touch of a finger tip.

BB circuitry block 230, RF circuitry block 240, TX/RX switch 245, WiFi (or WLAN) transceiver 270, BT transceiver 265, and USB interface 255 comprise a communications interface that enables the PD 102 to communicate either wired or wirelessly with PMDs 104 and RS 106.

According to the principles of the disclosure, applications 212 include an IoT interface 120 and applications 122 and 124, as shown and described with reference to FIG. 1.

FIG. 3 illustrates a method 300 for managing applications as IOT objects according to the disclosure. For illustration of the method 300, reference is made to the Open Cloud server 104 and the computing device 102 described with reference to FIG. 1. Additionally, the method 300 includes a camera app 322 and a Facebook app 324. The apps 322 and 324 are similar to the apps 122 and 124 of FIG. 1, however some of the actions described below may be performed on behalf of the apps 322 and 324 by the associated IoT interface 120 of FIG. 1.

In step 320, at power up of computing device 102, or when the IoT interface 120 is started, the device 102 sends a registration message to the Open Cloud server 104. Included in the registration message is device ID information that identifies the device 102 to the server 104. The device ID information may include address information relating to a WiFi, cell provider, or other communication network through which the device 102 is communicating with the Open Cloud server 104 and other IoT devices within the network 100.

In response to the registration message from the device 102, the Open Cloud server 104 may send an acknowledgement message (not shown) to the device 102, which may include information facilitating further communication with the Open Cloud server 104 or other IoT devices. The Open Cloud server 104 and the IoT interface 120 of the device 102 may also communicate further to establish a dedicated socket in a communication stack of the device 102 to use for push notifications sent from the Open Cloud server 104 to the IoT interface 120.

In steps 322 and 324, the device 102 takes any necessary further steps to notify the camera app 322 and the Facebook app 324—or their associated IoT interface 120—that the device 102 is registered and provide the device ID of the device 102 and any additional information needed to communicate with the Open Cloud server 104 and/or other IoT devices within the network 100.

Further, in a first message sent from the Open Cloud server 104 to the camera app 322, the Facebook app 324, or other IoT-enabled app, information such as user ID and password may be exchanged between the Open Cloud server 104 and the IoT-enabled app to authorize a user of the IoT-enabled app to the Open Cloud server 104. Such authorization information may be cached by the IoT-enabled app, such that subsequent messages between the Open Cloud server 104 and the IoT-enabled app need not repeat the authorization process. If the IoT-enabled app is shut down and subsequently re-launched, however, the user may be re-authorized to assure security in the system according to the disclosure.

In step 326, the camera app 322 registers itself with the Open Cloud server 104 as an IoT-enabled app. Information provided to the Open Cloud server 104 may include the device ID of the device 102, an application ID of the camera app 322, and information relating to the IoT capabilities of the camera app 322. Such capabilities may include generating an event when a photo is taken, responding to a command to take a photo, and other events/commands suitable to a camera app.

Similarly, in step 328, the Facebook app 324 registers itself with the Open Cloud server 104 as an IoT-enabled app. Information provided to the Open Cloud server 104 may include the device ID, an application ID of the Facebook app 324, and information relating to the IoT capabilities of the Facebook app 324. Such capabilities may include responding to a command to post text, photos or video to the user's Facebook page, to generate an event when the user is tagged in another user's Facebook page, or other events/commands suitable to a Facebook app.

In step 330, a user of the device 102 programs an IoT application to subscribe to the photo event from the camera app 322 and, when received, to obtain the new photo and post it to the user's Facebook page using the Facebook app 324. The IoT application may be executing on an app engine in the Open Cloud server 104 or in the IoT interface 120. Step 330 includes sending a subscription message to the Open Cloud server 104 with appropriate information to subscribe to the photo event. Step 330 may include a user activating a previously programmed IoT application.

Subsequent steps in the method 300 await the user's taking of a photo, in step 332. In response, in step 334, the IoT interface 120 sends the photo event on behalf of the camera app 322. Because the Facebook app 324 has subscribed to the photo event, the Open Cloud server 104 notifies the Facebook app 324 of the photo event and, in step 338, the Facebook app 324 posts the photo to the user's Facebook page. The notification may be asynchronous, via a dedicated socket, or synchronous, as a result of the IoT interface 120 polling the Open Cloud server 104 for notifications. The photo may be data within the event and notification messages, or information relating to the photo may be sent to the Facebook app 324 that enables the app to obtain the photo via a subsequent communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for managing applications as Internet of Things (IoT) devices or IoT-enabled applications, the system comprising:
   an IoT server communicatively coupled to a network;
   a computing device communicatively coupled to the network, the computing device comprising an IoT interface and a first IoT-enabled application having a remote procedure call (RPC) interface; and
   an IoT application, executing on one of the IoT server and the computing device,
   wherein the IoT interface on the computing device is configured to:
      communicate with the first IoT-enabled application on the computing device using the RPC interface;
      communicate with one of the IoT server and the IoT application on the computing device using an IoT protocol configured for communications between the IoT interface, the IoT server and the IoT application, and
      cause the first IoT-enabled application to be presented to the IoT server or IoT application on the computing device as an IoT device.

2. The system of claim 1, wherein the IoT application executes on the IoT server.

3. The system of claim 1, wherein the IoT application on the computing device is executed upon receipt of an IoT event by the IoT interface of the computing device.

4. The system of claim 1, wherein
   the computing device comprises a second IoT-enabled application having a second RPC interface,
   the IoT interface on the computing device is configured to communicate with the second IoT-enabled application using the second RPC interface, and
   the IoT application is configured to command the second IoT-enabled application to respond to an event generated by the first IoT-enabled application.

5. The system of claim 1, further comprising one or more hard IoT devices, wherein the IoT application is configured to activate one of the one or more hard IoT devices in response to an event generated by the first IoT-enabled application.

6. The system of claim 1, further comprising one or more hard IoT devices, wherein the IoT application is configured to command the first IoT-enabled application to respond to an event generated by one of the one or more hard IoT devices.

7. The system of claim 1, wherein the IoT interface is configured to receive notice of an occurrence of an IoT event by one of a synchronous message and an asynchronous message.

8. A computing device for use in a system for managing applications as Internet of Things (IoT) devices or IoT-enabled applications, the computing device comprising:
- a memory comprising a plurality of applications, the applications comprising an IoT interface application and a first IoT-enabled application having a remote procedure call (RPC) interface;
- a processor configured to execute one or more of the plurality of applications in the memory; and
- a communication interface coupled to the processor and configured to communicate with an IoT server,
- wherein the IoT interface application is configured to:
  - communicate with the first IoT-enabled application using the RPC interface;
  - communicate with one of the IoT server and one of an IoT application executing on the IoT server and an IoT application executing on the computing device, wherein the communications use an IoT protocol configured for communications between the IoT server and, at least one of, the IoT application executing on the IoT server and the IoT application executing on the computing device; and
  - present the first IoT-enabled application to the IoT server or IoT application as an IoT device.

9. The computing device of claim 8, wherein the IoT interface application is configured to communicate with the IoT application executing on the IoT server.

10. The computing device of claim 8, wherein the plurality of applications comprises the IoT application.

11. The computing device of claim 10, wherein the communication interface is configured to communicate with one or more hard IoT devices and the IoT application is configured to activate one of the one or more hard IoT devices in response to an event generated by the first IoT-enabled application.

12. The computing device of claim 10, wherein the communication interface is configured to communicate with one or more hard IoT devices and the IoT application is configured to command the first IoT-enabled application to respond to an event generated by one of the one or more hard IoT devices.

13. The computing device of claim 8, wherein
the plurality of applications comprises a second IoT-enabled application having an RPC interface, and
the IoT interface application is configured to
communicate with the second IoT-enabled application using the RPC interface,
generate an IoT event based upon a signal received from the first IoT-enabled application, and
cause the second IoT-enabled application to perform a function based upon a command received from the IoT application.

14. The computing device of claim 8, wherein the IoT interface application is configured to receive notice of an occurrence of an IoT event by one of a synchronous message and an asynchronous message.

15. A method of managing applications as Internet of Things (IoT) objects or IoT-enabled applications, the method comprising:
- coupling an IoT server communicatively with a network;
- coupling a computing device communicatively with the network, the computing device comprising and IoT interface and a first IoT-enabled application having a remote procedure call (RPC) interface;
- executing and IoT application on one of the IoT server and the computing device;
- communicating, by the IoT interface on the computing device, with the first IoT-enabled application on the computing device using the RPC interface;
- communicating, by the IoT interface on the computing device, with one of the IoT server and the IoT application on the computing device using an IoT protocol configured for communications between the IoT interface, the IoT server and the IoT application; and
- causing, by the IoT interface on the computing device, the first IoT-enabled application to be presented to the IoT server or IoT application as an IoT device.

16. The method of claim 15, wherein the IoT application executes on the IoT server.

17. The method of claim 15, wherein upon receiving an IoT event by the IoT interface, executing the IoT application on the computing device.

18. The method of claim 15, wherein the computing device comprises a second IoT-enabled application having a second RPC interface, the method further comprising:
- communicating, by the IoT interface on the computing device, with second IoT-enabled application using the second RPC interface; and
- commanding, by the IoT application, the second IoT-enabled application to respond to an event generated by the first IoT-enabled application.

19. The method of claim 15, further comprising activating, by the IoT application, one or more hard IoT devices in response to an event generated by the first IoT-enabled application.

20. The method of claim 15, further comprising commanding, by the IoT application on the computing device, the first IoT-enabled application to respond to an event generated by one of one or more hard IoT devices.

* * * * *